US009229656B1

(12) United States Patent  (10) Patent No.: US 9,229,656 B1
Contreras et al.  (45) Date of Patent: Jan. 5, 2016

(54) MANAGING SETTINGS AND QUERIES IN HOST-BASED DATA MIGRATION

(75) Inventors: Cesareo Contreras, Northridge, MA (US); Helen Raizen, Jamaica Plain, MA (US); Michael E. Bappe, Loveland, CO (US); Xunce Zhou, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 354 days.

(21) Appl. No.: 13/535,851

(22) Filed: Jun. 28, 2012

(51) Int. Cl.
*G06F 13/14* (2006.01)
*G06F 3/06* (2006.01)

(52) U.S. Cl.
CPC .............. *G06F 3/067* (2013.01); *G06F 3/0647* (2013.01)

(58) Field of Classification Search
CPC   G06F 3/067; G06F 3/0647; G06F 2003/0697
USPC ........................................................ 711/162
See application file for complete search history.

(56) References Cited

U.S. PATENT DOCUMENTS

| | | | |
|---|---|---|---|
| 7,263,590 B1 * | 8/2007 | Todd et al. ..................... 711/165 | |
| 7,469,313 B1 | 12/2008 | Venkatanarayanan et al. | |
| 7,536,503 B1 | 5/2009 | Venkatanarayanan et al. | |
| 7,689,786 B1 | 3/2010 | Riordan et al. | |
| 7,770,053 B1 | 8/2010 | Bappe et al. | |
| 7,809,912 B1 | 10/2010 | Raizen et al. | |
| 7,904,681 B1 | 3/2011 | Bappe et al. | |
| 8,321,643 B1 * | 11/2012 | Vaghani et al. ............... 711/162 |
| 8,793,448 B2 * | 7/2014 | Wedlake et al. .............. 711/162 |
| 2003/0074523 A1 * | 4/2003 | Johnson ........................ 711/112 |
| 2003/0140210 A1 * | 7/2003 | Testardi ........................ 711/203 |
| 2004/0139237 A1 * | 7/2004 | Rangan et al. .................... 710/1 |
| 2004/0153711 A1 * | 8/2004 | Brunelle et al. .................. 714/4 |
| 2005/0172073 A1 * | 8/2005 | Voigt et al. .................... 711/114 |
| 2006/0031594 A1 * | 2/2006 | Kodama ............................ 710/5 |
| 2006/0224844 A1 * | 10/2006 | Kano et al. ..................... 711/162 |
| 2009/0037679 A1 * | 2/2009 | Kaushik et al. ............... 711/162 |
| 2009/0234982 A1 * | 9/2009 | Li et al. ........................... 710/19 |
| 2012/0131391 A1 * | 5/2012 | Musolff ......................... 714/48 |

OTHER PUBLICATIONS

Clark et.al. "Live Migration of Virtual Machines" NSDI 2005, USENIX Association.*
Don et al., "Automatic Failover During Online Data Migration," U.S. Appl. No. 12/750,391, filed Mar. 30, 2010.
"EMC Powerpath Migration Enabler Host Copy: A Detailed Review," EMC White Paper, Mar. 2011, 42 pages.
Messerschmidt, et al., "Techniques for Providing a Customizable Roadmap for Migrating to Cloud Computing," U.S. Appl. No. 13/246,374, filed Sep. 27, 2011.

(Continued)

*Primary Examiner* — Yaima Rigol
*Assistant Examiner* — Tasnima Matin
(74) *Attorney, Agent, or Firm* — BainwoodHuang

(57) ABSTRACT

An improved technique migrating data from a source LUN (logical unit) to a target LUN manages control I/O's in a manner that depends on the current state of data migration and on whether the control I/O's specify that reservation information for a LUN is to be set or queried. Control I/O's specifying reservation settings during the different states of migration are treated the same way as data WRITEs during those respective states, and control I/O's specifying reservation queries during different migration states are treated the same way as data READs during those respective states.

20 Claims, 4 Drawing Sheets

(56) References Cited

OTHER PUBLICATIONS

Specht et al., "Multi-Machine Atomic Seamless Migration," U.S. Appl. No. 12/750,382, filed Mar. 30, 2010.
Wigmore, et al., "Techniques for Performing Online Data Migration While Effectively Migrating SCSI Reservations Between Source and Target Arrays," U.S. Appl. No. 12/750,388, filed Mar. 30, 2010.
Zeryck et al., "Migration Analyzer for Hardware-Based Storage Tiering," U.S. Appl. No. 12/639,469, filed Dec. 16, 2009.

* cited by examiner

MANAGING SETTINGS AND QUERIES IN HOST-BASED DATA MIGRATION

BACKGROUND

Administrators of data storage systems are often required to replace logical storage units (LUNs) as the LUNs age, become obsolete, or become unreliable. In many cases, it is desired to transfer all data stored on an original LUN (i.e., a "source" LUN) to a new destination LUN (i.e., a "target" LUN) which will replace the source LUN. Data transfer from the source LUN to the target LUN is conducted using a process called "data migration."

A typical data storage system also includes one or more host computing systems (i.e., "hosts") connected to LUNs over high-speed paths. The LUNs may be provided in one or more disk arrays, and the hosts are configured to run one or more applications on behalf of users. The hosts may include tools for migrating data from a source LUN to a target LUN within an array or between arrays. These tools are designed to operate substantially transparently to users, i.e., to be run in the background with little or no effect on executing applications.

An example of a data migration tool is the PowerPath Migration Enabler (PPME), which is available as part of the PowerPath® driver from EMC Corporation of Hopkinton, Mass. As is known, the PowerPath® driver supports multiple data storage functions, including data migration, as well as multipathing, encryption, and other functions. PPME conducts data migration through several distinct states: Setup; Syncing; Source Selected; Target Selected; CommittedAndRedirected (for native device names only); and Committed. During data migration, data is bulk copied from the source LUN to the target LUN and I/O requests for READs and WRITEs are sent to either the source LUN, the target LUN, or both, depending on the state of migration and on whether the I/O requests are READs or WRITEs. Also, in cases where the source LUN and the target LUN are identified with pseudonames, the pseudonames are automatically swapped, so that the target LUN assumes the identity of the source LUN. In cases where the source LUN and target LUN are identified with native names, user applications are manually reconfigured to swap the names. At the conclusion of data migration, the entire contents of the source LUN have been moved to the target LUN, and subsequent I/O requests are directed exclusively to the target LUN.

SUMMARY

Data storage systems are increasingly used in the context of clusters. As is known, "clusters" are groups of hosts that work together to execute applications on behalf of users. To users, a cluster may appear to be a single system. An application run by a user may start executing on one host, and, if a problem arises, the application may failover and resume on another host within the cluster.

Although they offer many benefits, clusters present particular challenges in host-based data migration (i.e., data migration controlled by a host). For example, a host managing migration of data from a source LUN to a target LUN may be required to contend with other hosts within the same cluster attempting to access the same LUNs. Access by these other hosts can cause the host managing the data migration to lose control of the contents of the source LUN and/or the target LUN, causing the contents of the source LUN and target LUN to diverge in unpredictable ways.

The Small Computer System Interface (SCSI) standard supports a concept called "reservations." Reservations can be used in a cluster or other computing environment to enforce exclusive access of a host to a particular LUN or to multiple LUNs. In theory, reservations should therefore help hosts to maintain exclusive access to source and target LUNs during migration.

Unfortunately, however, making reservations work properly during host-based migration has proven to be problematic. Conventionally, a migration tool treats reservation commands as ordinary control I/O requests (i.e., "control I/O's"). If the migration tool is configured to select the source LUN for data READs during a particular state of migration, the migration tool will also direct all control I/O's pertaining to reservations to the source LUN. Similarly, if the migration tool is configured to select the target LUN for data READs during a particular migration state, the migration tool will also direct all control I/O's pertaining to reservations to the target LUN. This manner of treating reservations as ordinary control I/O's does not effectively transfer reservations from the source LUN to the target LUN, however. Treating reservations in this manner can cause the source LUN and/or target LUN to be left in an unreserved state, leaving these LUNs vulnerable to being written by other hosts on the cluster. Without access to the source LUN and target LUN properly regulated, the contents of these LUNs can become corrupted, setting off a chain of events that may eventually cause the application to fail. Each such failure results in a disruption of service to the user, who may be required to restart the application.

In contrast with the prior approach, which can lead to application failures during data migration when reservations for accessing a LUN are needed but not present, an improved technique for data migration includes handling control I/O's in a manner that depends on the current state of data migration and on whether the control I/O's specify that reservation information for a LUN is to be set or queried.

For example, when a data migration process is operating in a state that directs READs to a designated LUN (i.e., to the source LUN or to the target LUN), the data migration is made also to direct control I/O's that specify queries for reservation information to that same designated LUN. Similarly, when the data migration process is operating in a state that directs WRITEs to a designated set of LUNs (i.e., to the source LUN, the target LUN, or both), the data migration process is made also to direct control I/O's that specify settings of reservation information to that same designated set of LUNs. In addition, other logical information of a LUN are treated in the same manner as reservation information, i.e., queries for logical information are treated as data READs and settings for logical information are treated as data WRITEs. "Logical information" as used herein refers to information, such as metadata, that logically attaches to the data of a LUN, rather than something that is a property of the underlying physical medium (e.g., one or more disk drives where the data of the LUN are stored).

In some examples, reservation information for the source LUN is stored in metadata, and the improved technique further includes applying the metadata stored in connection with the source LUN to the target LUN. For instance, metadata storing reservation information for the source LUN may be copied and applied to the target LUN. Thus, the improved technique effects bulk transfer of reservation information from source to target, as well as changes in reservation information that occur during the course of data migration. The same bulk transfer process can be conducted for metadata storing other logical information.

Certain embodiments are directed to a data migration process operable by a host computing system for migrating data from a source LUN to a target LUN. The data migration process includes, during a first state of data migration, directing I/O write requests to both the source LUN and the target LUN to effect writing of data from an application running on the host computing system to both the source LUN and the target LUN. The data migration process further includes, during the first state of data migration, directing I/O control requests for setting reservation information of the source LUN to both the source LUN and the target LUN to effect changes in settings of the source LUN and the target LUN.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is not limited to the example embodiments disclosed.

An improved technique for data migration handles control I/O's in a manner that depends on the current state of data migration and on whether the control I/O's specify that logical information for a LUN is to be set or queried.

Figure 1:
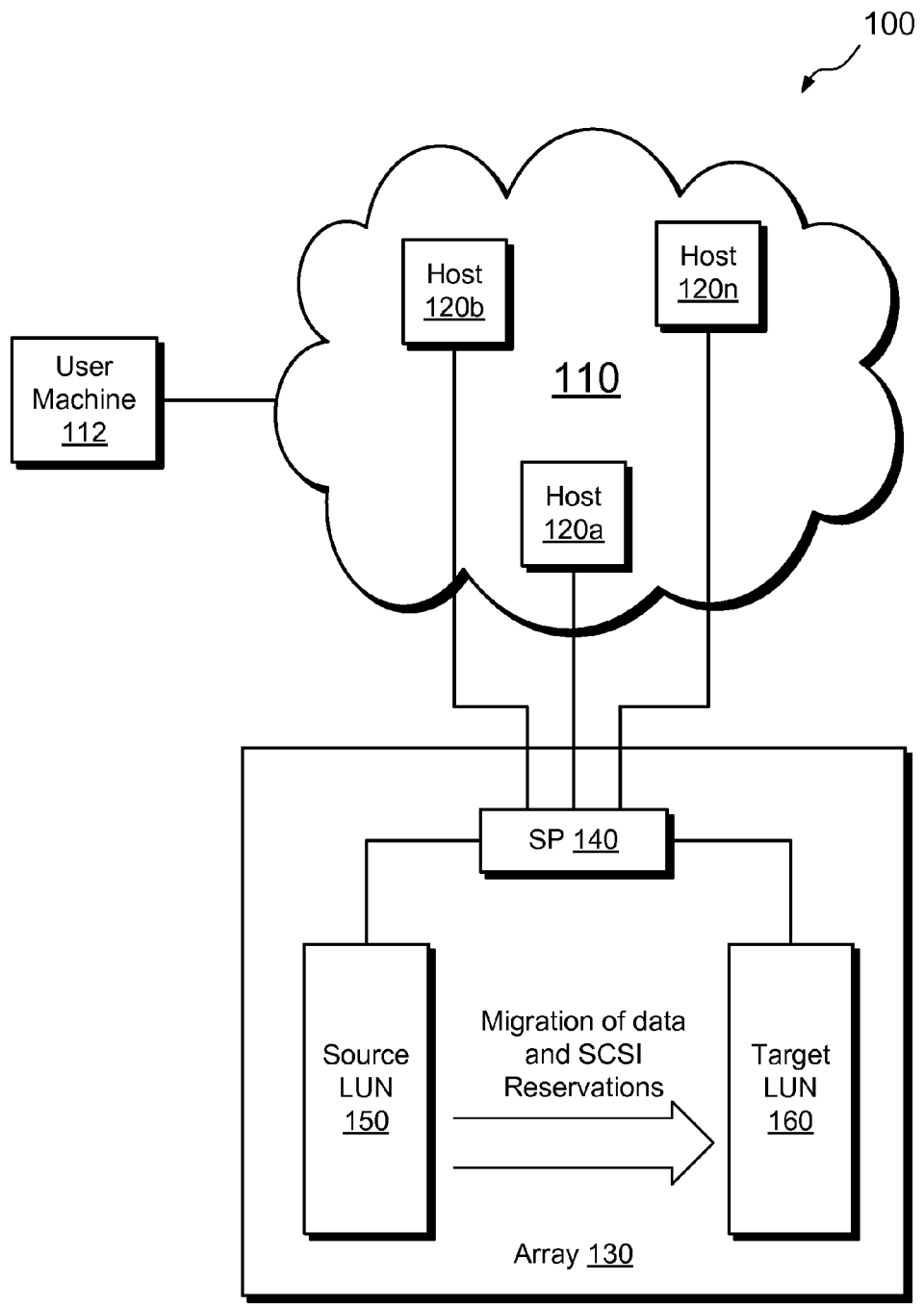
FIG. 1 is a block diagram of an example electronic system including, inter alia, a data storage system having a source LUN, a target LUN, and a cluster of hosts.

FIG. 1 shows an example electronic system 100 in which an improved data migration technique may be practiced. The electronic system 100 includes a cluster 110 of hosts 120a-n operatively connected to a user machine 112 and to a storage array 130. The storage array 130 includes a storage processor 140, a source LUN 150, and a target LUN 160. The array 130 may include other LUNs, additional storage processors, a semiconductor memory cache, and other components, which are omitted from the figure for simplicity. In various examples, the storage media of the array 130 include magnetic media, such as disk drives and tapes, optical media, non-volatile semiconductor media, and/or any combination of such media. Examples of the array 130 include any of the Symmetrix®, CLARiiON®, and VNX® families of arrays, which are available from EMC Corporation of Hopkinton, Mass. The cluster 110 is preferably connected to the array 130 over a high-speed medium. Suitable example connection media include Fibre Channel and iSCSI.

The user machine 112 typically connects to the cluster 110 via a computer network, such as the Internet, to run an application on behalf of a user of the user machine 112. Many user machines 112 can be provided. To the user of a user machine 112, the cluster 110 may appear to be a single system. The application may run on a single host (e.g., 120a). In the event of a failure of the host 120a, the application can failover to another host (e.g., the host 120b), which may continue execution of the application without the user perceiving any disruption.

Data migration from the source LUN 150 to the target LUN 160 can be initiated by any of the hosts 120a-n. For example, an administrator can access one of the hosts 120a-n and run a utility on that host for conducting a data migration procedure. In an example, the administrator can enter commands to set up migration and to advance migration through different states. In some examples, the host running the utility performs a bulk copy of data from the source LUN 150 to the target LUN 160. The host performs other functions as well, such as setting up the migration, managing I/O requests to the source LUN 150 (or to the target LUN 160) during the course of migration, swapping the names of the source LUN 150 and target LUN 160 at the conclusion of migration, and cleaning up after the migration.

During migration, the host also transfers reservations (e.g., SCSI reservations and registration information) from the source LUN 150 to the target LUN 160. Also, the host manages control I/O's that specify settings or queries during the migration process. Such control I/O's include, inter alia, commands for setting and querying reservations of LUNs (e.g., SCSI persistent reservation commands) or other logical information. As will become apparent, the host managing data migration treats control I/O's specifying settings during the different states of migration the same way it treats WRITEs during those respective states, and treats control I/O's specifying queries during different migration states the same way it treats READs during those respective states.

Figure 2:
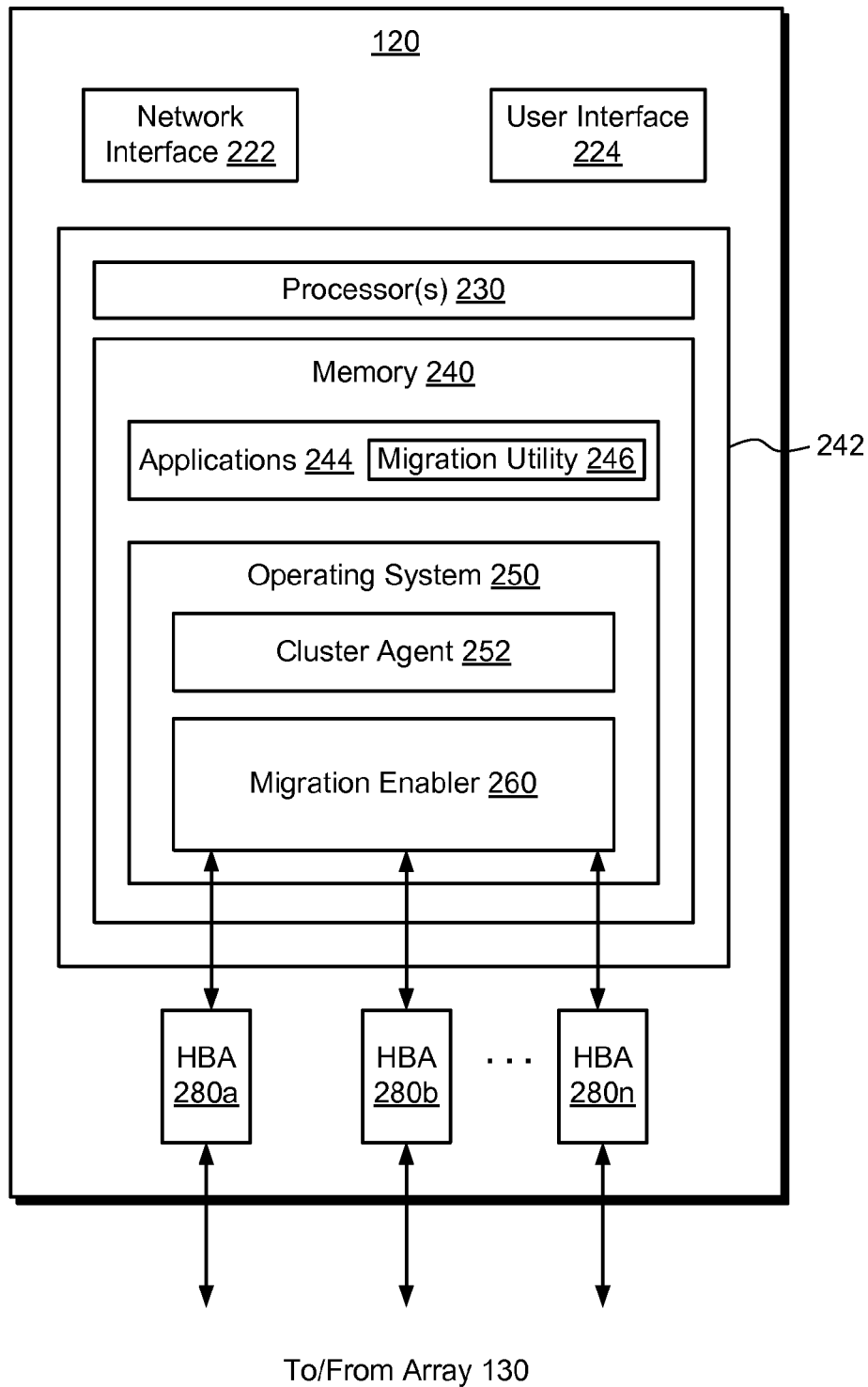
FIG. 2 is a block diagram of an example host, which is representative of any of the hosts of FIG. 1.

FIG. 2 shows the structure of an example host 120 in greater detail. The host 120 can be any of the hosts 120a-n and is representative of such hosts. It is understood, however, that the different hosts 120a-n need not be identical to one another. For example, only a subset of the hosts 120a-n (e.g., a single host) may be configured for performing data migration.

The host 120 includes a network interface 222, a user interface 224, a set of processors (e.g., one or more processing chips and/or assemblies) 230, memory 240 (both volatile and non-volatile), and host bus adapters 280a-n. The set of processors 230 and memory 240 together form a specialized circuit 242 that is constructed and arranged to carry out various processes described herein in connection with data migration.

The network interface 222 may include one or more network interface cards and allows the host 120 to connect to other hosts within the cluster 110, as well as to the user machine(s) 112. The user interface 224 may include a keyboard, pointer, and display, and/or some other human interface device, and allows an administrator or other user to access the host 120. In some implementations, the user interface 224 is omitted and administrators instead access the host 120 via the network interface 222.

The memory 240 includes applications 244 and an operating system 250. The applications 244 include one or more applications that can be run on behalf of users of the user machine(s) 112, as well as a migration utility 246, which can be run by an administrator for conducting data migration. The operating system 250 includes a cluster agent 252 and a migration enabler 260. The cluster agent 252 manages reservations of LUNs in the array 130 on behalf of the cluster 110. In some examples, the cluster agent 252 manages additional functions of the cluster 110, such as failover. Also, in some examples, the cluster agent 252 is provided as a software construct separate from the operating system 250. In further examples, the cluster agent 252 includes different portions, with one or more portions included within the operating system 250 and other portions provided as constructs separate from the operating system 250.

The migration enabler 260 runs in the kernel of the operating system 250 and is disposed in an I/O stack of the host 120, such that all I/O requests directed to the array 130 pass through the migration enabler 260. The migration enabler 260 operates in coordination with the migration utility 246 for managing low-level control of I/O requests to the source LUN 150 and the target LUN 160 during the course of data migration. In one example, the migration enabler 260 is provided as an extension of an I/O filter driver, such as the EMC PowerPath® driver, which performs multiple functions in connection with I/O request processing. For example, the migration enabler 260 may be provided in a version of the PowerPath® Migration Enabler (PPME).

It is understood that the memory 240 may include a myriad of other software constructs; however, such constructs are omitted from FIG. 2 in the interest of simplicity. Also, the improvements hereof are not limited to any particular operating system or type of operating system. Non-limiting examples of suitable operating systems include Microsoft Windows™, Unix, Red Hat Linux, and vSphere® from VMWare®.

In operation, the host 120 runs one of the applications 244 on behalf of one or more of the users of the cluster 110. As an application 244 executes instructions for accessing various LUNs of the array 130, the cluster agent 252 manages reservations of the LUNs needed to maintain and appropriately restrict access to the LUNs. For example, to reserve a LUN for use by the host 120, the cluster agent 252 registers each of the host bus adapters 280a-n of the host 120 with the LUN. Registration involves the host 120 generating a unique reservation key and storing the key in connection with the LUN on the array 130, e.g., using the SCSI persistent reservation out (PER OUT) command. Once the host 120 is registered, the host 120 may thereafter change reservation settings of the LUN, e.g., using other functions of the PER OUT command. The host 120 may also query the reservation state of the LUN, e.g., using the SCSI persistent reservation in (PER IN) command. Migration of data from the source LUN 150 to the target LUN 160 includes ensuring that the source LUN 150 and the target LUN 160 each have the proper reservations in place for each respective state of migration, so that data READs and WRITEs can be effected without errors.

Reservation information is typically stored for each LUN in metadata on the array 130. The metadata includes registration keys and other reservation information for each LUN. In one example, the metadata are stored on the storage processor 140 of the array 130.

While the host 120 is operating in the manner described above, an administrator may start the migration utility 246 for migrating the contents of the source LUN 150 to the target LUN 160.

Figure 3:
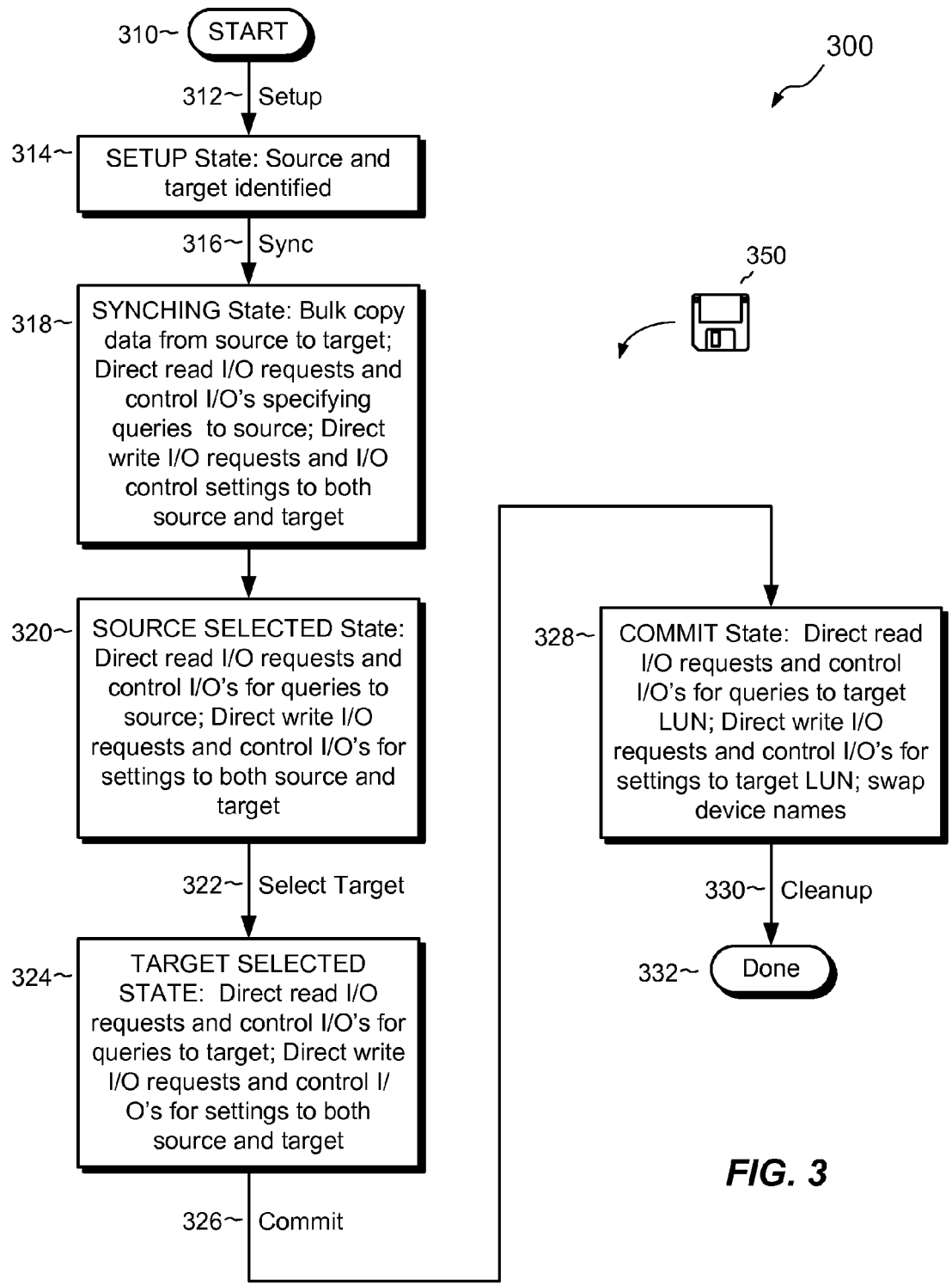
FIG. 3 is a flowchart showing an example data migration process for non-disruptively managing control I/O's for queries and settings that occur during data migration.

FIG. 3 shows an example process 300 for data migration, including migration of reservations from the source LUN 150 to the target LUN 160. In an example, the process 300 is conducted by the host 120 (or any of the hosts 120a-n), and particularly by the set of processors 230 executing the migration utility 246 and the migration enabler 260 in the memory 240 of the host 120.

The migration process 300 can proceed without disruption to users with the aid of "pseudo devices." As is known, pseudo devices are abstractions of native devices. Each LUN (a native device) has a name or other identifier that is generally fixed. For example, the source LUN 150 has one name and the target LUN 160 has another name. These names are typically not changed during the migration process 300. Pseudo devices have names ("pseudonames") that can be mapped to different LUNs at different times, however. Preferably, the migration utility 246 and the migration enabler 260 use pseudonames rather than native device names to refer to LUNs. Prior to beginning of the migration process 300, a particular pseudoname is mapped to the source LUN 150. Near the end of the migration process 300, however, this pseudoname is remapped so that the same name points to the target LUN 160. The use of pseudonames thus allows the source LUN 150 to be replaced with the target LUN 160 without any need to reconfigure the application to use the target device's name in place of the source device's name. Migration can thus be run to completion without disrupting any executing applications.

The migration process 300 is seen to start at step 310. To begin data migration, setup activities 312 are performed. The setup activities 312 include specifying the source LUN 150 and target LUN 160. The source and target LUNs 150 and 160 can be on the same array (e.g., the array 130) or on different arrays. The different arrays can be of different types. The setup activities 312 may also include other activities, such as setting a throttle for host migration activity and checking that the target LUN 160 is large enough to accept all of the data on the source LUN 150. When the setup activities complete, data migration enters a setup state 314.

From the setup state 314, an administrator can issue a sync command 316. In response to the sync command 316, data migration proceeds to a synching state 318. During the synching state 318, data is read from the source LUN 150 and copied to the target LUN 160. Depending on the size of the source LUN 150, this state can proceed for a significant amount of time. Also during this state, reservation information for the source LUN 150 is applied to the target LUN 160. For example, metadata for the source LUN 150 stored in the storage processor 140 can be copied for use with the target LUN 160. Any reservations that have been made by hosts on the source LUN 150 are thus applied to the target LUN 160.

During the synching state 318, the applications 244 may continue to run and the host 120 may continue to process I/O requests. The applications may direct I/O requests to the pseudo device name mapped to the source LUN 150. Some of these I/O requests relate to READs and WRITEs, whereas others relate to reservations and other types of queries and settings. In handling these I/O requests, the migration enabler 260 directs I/O requests for READs to the source LUN 150 and directs I/O requests for WRITEs to both the source LUN 150 and the target LUN 160. Also, the migration enabler 260 directs control I/O's for querying settings (e.g., SCSI PER IN commands) to the source LUN 150 and directs control I/O's for establishing settings (e.g., SCSI PER OUT commands) to both the source LUN 150 and the target LUN 160. In this manner, reservations as well as data are kept in sync between the source LUN 150 and the target LUN 160 throughout the synching state 318.

Once all data is bulk copied from the source LUN 150 to the target LUN 160, data migration enters the source selected state 320. Here, processing of newly arriving I/O requests proceeds as it did in the synching state. I/O requests for READs are directed to the source LUN 150 and I/O requests for WRITEs are directed to both the source LUN 150 and the target LUN 160. Also, control I/O's for querying settings (e.g., SCSI PER IN commands) are directed to the source LUN 150 and control I/O's for establishing settings (e.g., SCSI PER OUT commands) are directed to both the source LUN 150 and the target LUN 160.

At any time during the source selected state 314, the administrator may issue a command 322 to transition to the target selected state 324. The target selected state gives an administrator an opportunity to test the target LUN 160 to ensure that it is performing as expected. During this state, I/O requests for READs are directed to the target LUN 160, whereas I/O request for WRITEs are directed to both the source LUN 150 and the target LUN 160. Also, control I/O's specifying queries (e.g., SCSI PER IN commands) are directed to the target LUN 160, whereas control I/O's specifying settings (e.g., SCSI PER OUT commands) are directed to both the source LUN 150 and the target LUN 160.

Once the administrator has verified proper operation of the target LUN 160, the administrator may issue a command 326 to transition migration to the committed state 328. The command 326 switches operation, permanently and irreversibly, from the source LUN 150 to the target LUN 160. In response to the command 326, the host 120 remaps the pseudoname that points to the source LUN 150 so that it points to the target LUN 160. Also, during the transition to the committed state, the pseudoname that previously pointed to the target LUN 160 may be remapped to point to the source LUN 150. Henceforth, all I/O requests from applications 244 using that pseudoname are directed to the target LUN 160 rather than to the source LUN 150. Therefore, READs and WRITEs are directed to the target LUN 160, as well as all control I/O's.

With migration completed, the administrator may next issue a command 330 to "cleanup" the source LUN 150. In response to the command 330, the source LUN 150 is modified to ensure that the operating system 250 and applications 244 do not confuse the source LUN 150 for the target LUN 160. For example, some data may be erased from the source LUN 150.

Although the acts of the process 300 are shown in a particular order, it is understood that certain acts may be ordered differently from the manner shown, and that some acts may be performed simultaneously. Also, the process 300 does not necessarily proceed in a single direction. If, during any state or in response to any command of the process 300, a failure occurs or an unexpected result is obtained, control may return to a previous state, or to the beginning, to allow the failure or unexpected occurrence to be remedied.

Also, although the process 300 presents an example of migration where the source LUN 150 and the target LUN 160 are identified with pseudonames, a similar process can be conducted with native names rather than pseudonames. With native names, migration involves an additional state, committedAndRedirected, which is entered from the target selected state. The committedAndRedirected state does not involve an automatic name swap. Rather, the administrator reconfigures the application to exchange device names manually (which requires shutting down the application first). Once the device names are exchanged, the administrator may issue an UndoRedirect command to move migration to the committed state and then restart the reconfigured application. Thus, migration using native names involves an additional state as compared with migration using pseudonames and does not avoid disruption of the application. During migration with native names, reservation and other logical information are treated as described above for migration with pseudonames.

Figure 4:
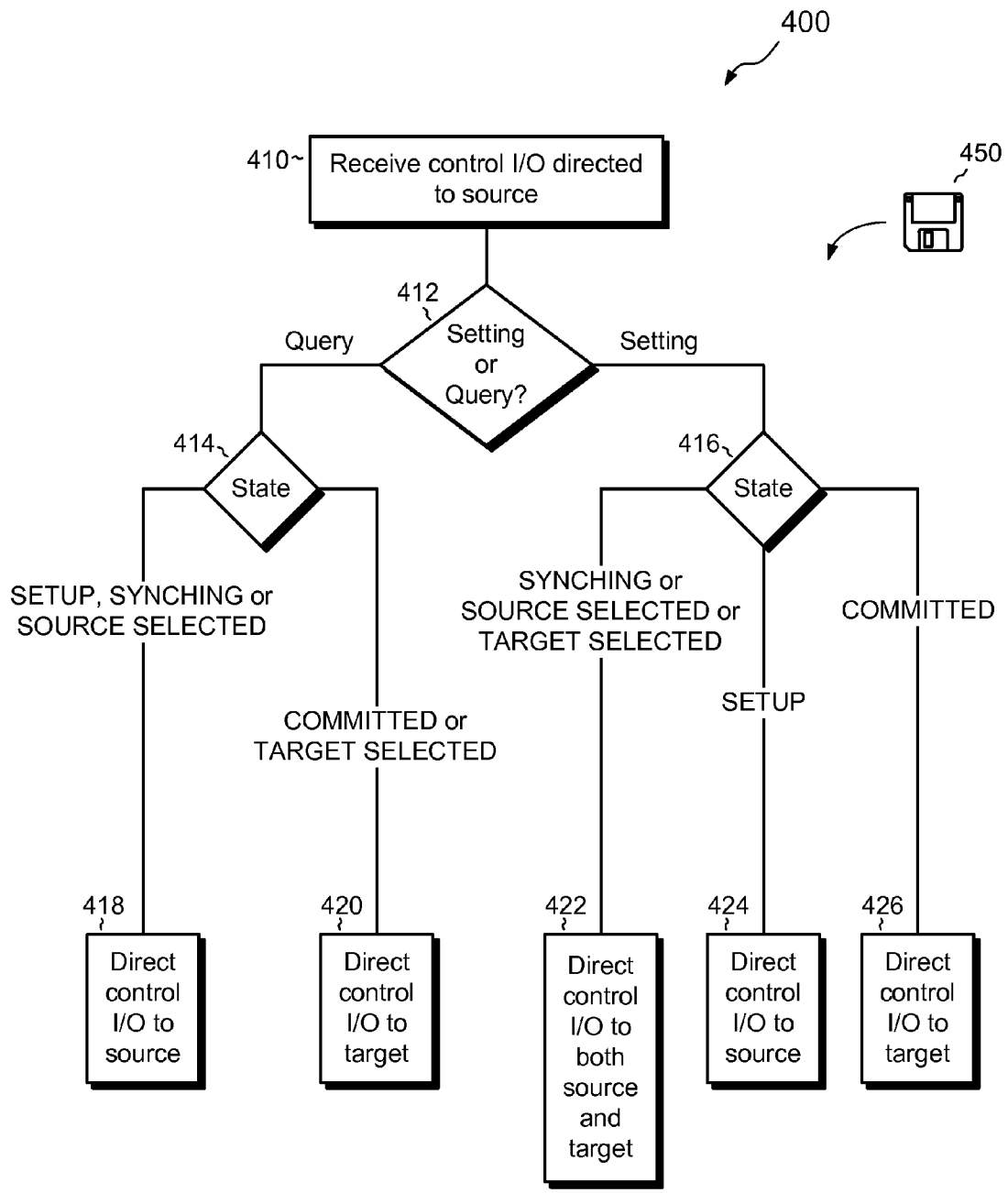
FIG. 4 is a flowchart showing an example process for managing control I/O's for queries and settings that occur during different states of data migration.

FIG. 4 shows an example process 400 for handling control I/O's during the migration process 300. In an example, the process 400 is conducted by the migration enabler 260.

At step 410, the migration enabler 260 receives a control I/O directed to the source LUN 150. The control I/O may arise based on activity of a running application 244 or based on other activity on the host 120.

At step 412, a determination is made as to whether the control I/O specifies a query or a setting. Queries include any requests for obtaining information about the source LUN 150. These include, for example, requests for reading reservation keys or other aspects of the device's reservation state. Settings include any requests for changing information about the source LUN 150. These include, for example, requests to set reservation keys or to establish other reservation settings. Note that control I/O's may specify something other than queries or settings, but such control I/O's are not part of the processing shown in FIG. 4.

If the received control I/O specifies a query, control proceeds to step 414, where a determination is made regarding the current state of data migration. If the current state is setup, synching, source selected, then the control I/O is handled as specified in step 418, i.e., the control I/O is directed to the source LUN 150. If the current state is committed or target selected, then the control I/O is handled as specified in step 420, i.e., the control I/O is directed to the target LUN 160.

If, at step 412, it was determined that the current control I/O specifies a setting, control proceeds to step 416, where the current state of migration is examined. If the current state is synching, source selected, or target selected, then the control I/O is handled as specified in step 422, i.e., the control I/O is directed to both the source LUN 150 and the target LUN 16. If the current state is setup, then control proceeds to step 424, i.e., the control I/O is directed to the source LUN 150. If, however, the current state of migration is committed, the control proceeds to step 426, i.e. the control I/O is directed to the target LUN 160.

It is understood that the particular processing sequence shown in the process 400 may be varied or performed in a different manner to achieve the same or similar results. For example, rather than first determining whether the control I/O pertains to a query or to a setting (in step 412), the process 400 may instead first determine the current state of migration. The nature of the control I/O can then be checked later, with appropriate processing for the specified control I/O type and state of migration then performed.

In addition, it is recognized that faults can sometimes occur when establishing settings of the source LUN 150 or target LUN 160 with control I/O's. For example, hardware or software errors can cause control I/O's specifying settings (e.g., SCSI reserve OUT instructions) to fail. An example technique for handling faults during data migration is disclosed in U.S. Pat. No. 7,770,053, entitled "Systems and methods for maintaining data integrity during a migration," which is hereby incorporated by reference in its entirety. The incorporated patent describes how faults are handled during READs and WRITEs. In an example, the techniques described in the incorporated patent can be applied herein to control I/O's that specify settings. In particular, faults that occur when executing control I/O's for settings are dealt with herein the same way faults are handled for data WRITEs in the incorporated patent.

An improved technique for data migration has been described, wherein control I/O's are handled in a manner that depends on the current state of data migration and on whether the control I/O's specify that information for a LUN is to be set or queried. Control I/O's specifying settings during the different states of migration are treated the same way as WRITEs during those respective states, and control I/O's specifying queries during different migration states are treated the same way as READs during those respective states.

As used throughout this document, the words "comprising," "including," and "having" are intended to set forth certain items, steps, elements, or aspects of something in an open-ended fashion. Although certain embodiments are disclosed herein, it is understood that these are provided by way of example only and that the invention is not limited to these particular embodiments. Also, while the designators "first," "second," "third," and so forth may be used to identify certain items or acts, it is understood that such designators are provided for enumeration only. Unless a clear indication is given to the contrary, the use of such designators is not intended to imply any particular sequence or ordering. Also, the identification of a "first" or other numbered item or act does not imply that a "second" or subsequent item or act must also be included.

Having described certain embodiments, numerous alternative embodiments or variations can be made. For example, although improvements have been disclosed with reference to SCSI persistent reservations, this is merely an example. Alternatively, the techniques disclosed herein may be applied to other types of reservations besides SCSI persistent reservations or to other technologies for enforcing access control to devices.

Also, queries and/or settings need not apply only to access control. In one example, queries and settings specified by control I/O's can apply to LUN caching. According to the SCSI standard, LUN cache settings can be queried using the "MODE SENSE" command and may be set using the "MODE SELECT" command. In response to the sync command 316, the migration utility 246, working in coordination with the migration enabler 260, can read the cache settings of the source LUN 150 (using the MODE SENSE command) and apply these settings to the target LUN 160 (using the MODE SELECT command). Any subsequently arising control I/O's for querying or changing the settings of the cache of the source LUN 150 are treated the same way as queries and settings described above, e.g., MODE SENSE commands are treated the same as PER IN commands and MODE SELECT commands are treated the same as PER OUT commands.

Also, although improvements hereof have been described in the context of hosts that form a cluster, this is merely an example. Alternatively, the improvements hereof can be applied in circumstances where only a single host 120 is used, or in environments with multiple hosts are networked together but without forming a cluster.

Also, data migration has been described in connection with device pseudonames. Although device pseudonames simplify data migration by avoiding the need to manually update device names in application programs, it is understood that the invention hereof is not limited to implementations that employ pseudonames. For example, the principles disclosed herein also apply to data migration using native names or other types of names.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 350 and 450 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A data migration process operable by a host computing system for migrating data from a source LUN to a target LUN, comprising:
    during a SYNCHING state of data migration,
        (i) directing I/O write requests addressed to the source LUN to both the source LUN and the target LUN to effect writing of data from an application running on the host computing system to both the source LUN and the target LUN; and
        (ii) directing I/O control requests for setting reservation information of the source LUN to effect changes in reservation settings of both the source LUN and the target LUN;
    receiving a command to enter a TARGET SELECTED state of data migration, the TARGET SELECTED state enabling testing of the target LUN prior to committing migration from the source LUN to the target LUN; and
    during the TARGET SELECTED state,
        (i) redirecting I/O read requests addressed to the source LUN to the target LUN to effect reading of data from the target LUN, and
        (ii) redirecting I/O control requests for querying reservation information of the source LUN to instead query reservation information of the target LUN.

2. The method of claim 1, wherein the reservation information of the source LUN is stored in a storage array as metadata for the source LUN, and wherein the method further comprises, during the SYNCHING state of data migration, applying the metadata for the source LUN to the target LUN.

3. The method of claim 2, wherein the source LUN resides on a first storage array and the target LUN resides on a second storage array, and wherein applying the metadata for the source LUN to the target LUN includes copying the metadata for the source LUN from the first storage array to the second storage array.

4. The method of claim 2, wherein the metadata of the source LUN and the metadata of the target LUN include SCSI persistent registration and reservation information, wherein the I/O control requests for querying reservation information of the source LUN include SCSI persistent reserve IN commands, and wherein the I/O control requests for setting reservation information of the source LUN include SCSI persistent reserve OUT commands.

5. The data migration process of claim 2, further comprising:
    during the TARGET SELECTED state of data migration,
        (i) directing I/O write requests addressed to the source LUN to both the source LUN and the target LUN to effect writing of data from the application to both the source LUN and the target LUN, and (ii) directing an I/O control request for setting reservation information of the source LUN to both the source LUN and the target LUN to effect changes in reservation information of both the source LUN and the target LUN.

6. The data migration process of claim 5, wherein the command for entering the TARGET SELECTED state is received from an administrator of the host computing system.

7. The data migration process of claim 6, further comprising, during the SYNCHING state of data migration:
issuing a SCSI MODE SENSE command to the source LUN to read cache settings of the source LUN; and
issuing a SCSI MODE SELECT command to the target LUN to apply the cache settings read in response to the SCSI MODE SENSE command to the target LUN.

8. The data migration process of claim 7, further comprising, in response to receiving the command to enter the TARGET SELECTED state of data migration:
directing a SCSI MODE SELECT command addressed to the source LUN to both the source LUN and the target LUN, to establish LUN cache settings on both the source LUN and the target LUN; and
redirecting a SCSI MODE SENSE command designating the source LUN to the target LUN to read LUN cache settings from the target LUN.

9. A computing device for migrating data from a source LUN to a target LUN, comprising a set of processors and memory, coupled to the set of processors, the memory constructed and arranged to store instructions executable by the set of processors, wherein the set of processors executing instructions from the memory forms a specialized circuit constructed and arranged to:
during a SYNCHING state of data migration, (i) direct I/O write requests addressed to the source LUN to both the source LUN and the target LUN to effect writing of data from an application running on the host computing system to both the source LUN and the target LUN, and (ii) direct I/O control requests for setting reservation information of the source LUN to effect changes in reservation settings of both the source LUN and the target LUN;
receive a command to enter a TARGET SELECTED state of data migration, the TARGET SELECTED state enabling testing of the target LUN prior to committing migration from the source LUN to the target LUN; and
during the TARGET SELECTED state, (i) redirect I/O read requests addressed to the source LUN to the target LUN to effect reading of data from the target LUN, and (ii) redirect I/O control requests for querying reservation information of the source LUN to instead query reservation information of the target LUN.

10. The computing device of claim 9, wherein the reservation information of the source LUN is stored in a storage array as metadata for the source LUN.

11. The computing device of claim 10,
wherein the I/O control requests for setting reservation information of the source LUN include SCSI PER OUT commands, and
wherein the I/O control requests for querying reservation information of the source LUN include SCSI PER IN commands.

12. The computing device of claim 11, wherein, during the SYNCHING state of data migration, the specialized circuit is further constructed and arranged to apply reservation information for the source LUN to the target LUN.

13. The computing device of claim 12, wherein, during the TARGET SELECTED state of data migration, the specialized circuit is further constructed and arranged to (i) direct I/O write requests addressed to the source LUN to both the source LUN and the target LUN to effect writing of data from the application to both the source LUN and the target LUN, and (ii) direct an I/O control request for setting reservation information of the source LUN to both the source LUN and the target LUN to effect changes in settings of the source LUN and the target LUN.

14. The computing device of claim 13, wherein, during the SYNCHING state of data migration, the specialized circuit is further constructed and arranged to:
issue a SCSI MODE SENSE command to read cache settings of the source LUN; and
issue a SCSI MODE SELECT command to apply the cache settings read in response to the SCSI MODE SENSE command to the target LUN.

15. The computing device of claim 14, wherein, in response to receipt of the command to enter the TARGET SELECTED state of data migration, the specialized circuit is further constructed and arranged to:
direct a SCSI MODE SELECT command designating the source LUN to both the source LUN and the target LUN to establish LUN cache settings on both the source LUN and the target LUN; and
redirect a SCSI MODE SENSE command designating the source LUN to the target LUN to read LUN cache settings from the target LUN.

16. A computer program product having a non-transitory, computer-readable medium including instructions which, when executed by a set of processors of a computing device, cause the set of processors to perform a data migration process for migrating data from a source LUN to a target LUN, the method comprising:
during a SYNCHING state of data migration, (i) directing I/O write requests addressed to the source LUN to both the source LUN and the target LUN to effect writing of data from an application running on the host computing system to both the source LUN and the target LUN, and (ii) directing a SCSI PER OUT command for setting persistent reservation information of the source LUN to both the source LUN and the target LUN to effect changes in persistent reservation settings of the source LUN and the target LUN;
receiving a command to enter a TARGET SELECTED state of data migration, the TARGET SELECTED state enabling testing of the target LUN prior to committing migration from the source LUN to the target LUN; and
during the TARGET SELECTED state, (i) redirecting I/O read requests addressed to the source LUN to the target LUN to effect reading of data from the target LUN, and (ii) redirecting a SCSI PER IN command designating the source LUN to query persistent reservation information of the target LUN.

17. The computer program product of claim 16, wherein, during the SYNCHING state of data migration, the method further comprises applying reservation information for the source LUN to the target LUN.

18. The computer program product of claim 17, wherein the method further comprises, during the TARGET SELECTED state of data migration, (i) directing I/O write requests addressed to the source LUN to both the source LUN and the target LUN to effect writing of data from the application to both the source LUN and the target LUN, and (ii) directing a SCSI PER OUT command for setting reservation information of the source LUN to both the source LUN and the target LUN to effect changes in reservation settings of the source LUN and the target LUN.

19. The computer program product of claim 18, wherein, during the SYNCHING state of data migration, the method further comprises:
issuing a SCSI MODE SENSE command to read cache settings of the source LUN; and issuing a SCSI MODE SELECT command to apply the cache settings read in response to the SCSI MODE SENSE command to the target LUN.

20. The computer program product of claim 19, wherein, in response to receipt of the command to enter the TARGET SELECTED state of data migration, the method further comprises:

directing a SCSI MODE SELECT command designating the source LUN to both the source LUN and the target LUN to establish LUN cache settings on both the source LUN and the target LUN; and redirecting a SCSI MODE SENSE command designating the source LUN to the target LUN to read LUN cache settings from the target LUN.

\* \* \* \* \*